United States Patent [19]

Smith

[11] Patent Number: 4,570,947
[45] Date of Patent: Feb. 18, 1986

[54] GAS SEALING AND FLUID SCAVENGE APPARATUS

[75] Inventor: Stanley Smith, Gloucestershire, England

[73] Assignee: Rolls-Royce Limited, London, England

[21] Appl. No.: 628,280

[22] Filed: Jul. 6, 1984

[30] Foreign Application Priority Data

Jul. 8, 1983 [GB] United Kingdom ................ 8318582

[51] Int. Cl.$^4$ .............................................. F16J 15/02
[52] U.S. Cl. ...................................... 277/225; 277/67; 277/135
[58] Field of Search ...................... 277/25, 67, 34, 80, 277/135

[56] References Cited

U.S. PATENT DOCUMENTS 3,765,688 10/1973 Junker .................................. 277/67
3,853,327 12/1974 Nellis .................................. 277/67

FOREIGN PATENT DOCUMENTS 947789 1/1964 United Kingdom .

Primary Examiner—Robert I. Smith
Attorney, Agent, or Firm—Parkhurst & Oliff

[57] ABSTRACT

A hydraulic seal and an oil scavenge system are combined, and oil pumping gears and other associated equipment thus obviated. The hydraulic seal 32 comprises an oil reservoir holding centrifuged oil, and an annular fin 22, the periphery of which dips in the oil. The fin 22 has an orifice 33 which receives the oil under pressure derived from the speed of rotation of the oil, and passes it via conduit 34,26 to an oil sump.

7 Claims, 4 Drawing Figures

GAS SEALING AND FLUID SCAVENGE APPARATUS

The invention relates to gas seals of the type where a fluid is discharged into a rotatable sump chamber and centrifuged radially outwards to form a rotating annulus into which protrudes the periphery of a static annular flange, thus forming a gas seal across the flange.

It is known to provide seals of the type mentioned above in gas turbine engines. Such seals may be used to help prevent oil vapour escaping from the bearing chambers thereby reducing the fire hazard of oil vapour communicating with other parts of the engine.

It is also known from British Patent Specification No. 947,789 to provide a bearing structure in a gas turbine engine, with a sump which is attached for co-rotation with the bearing outer race. A static scoop protrudes into the sump and an orifice at the extremity of the scoop dips into oil which is held against the sump wall by centrifugal force. The ram effect of the oil is sufficient to force it into the orifice of the scoop and thence to drains. However, there is no disclosure of a hydraulic gas seal in this specification.

A gas turbine engine in which seals of the type described above and an oil scavenge system of the type disclosed in the above Patent Specification are both used, could present design problems. A static scoop protruding into the annulus of oil may create sufficient disturbance to reduce the effectiveness of the adjacent hydraulic gas seal. Also the bearing chamber may have to be made larger than normal thus reducing the space available for other engine parts. Normally a bearing has a rotating inner race and a static outer race but a static scavenging scoop must be radially inward of the rotating chamber in which the fluid is centrifuged. Thus a further design problem may occur if the hydraulic gas seal is required for sealing a bearing chamber in which lubricating oil forms the seal.

An object of the invention is to provide a hydraulic gas seal of the type comprising a rotatable sump chamber where the periphery of a static annular flange projects into a centrifuged annulus of fluid with means for scavenging the fluid from the chamber.

The invention as claimed has means for removal of fluid from the chamber comprising at least one conduit incorporated in the flange.

The conduit terminates in an orifice which, in use, is at least partially submerged in the annulus of fluid and is arranged on the periphery of the flange. The ram effect of the rotating fluid is utilized to force it through the orifice and away from the sump via the conduit.

The orifice may be completely submerged in the fluid or partially submerged so that the gas moving with and adjacent to the rotating fluid may also be removed via the conduit. Although in the latter case there will be slight leakage across the seal, the main sealing effect will not be lost.

The orifice may be arranged on a ridge on the periphery of the flange so as to face substantially in a direction opposite that of the rotation of the fluid.

The rotatable sump chamber may be provided with vanes which, in use, exert a driving force on the fluid, especially fluid which is remote from the walls of the chamber.

The seal may also feature one or more bleed passages for allowing a small flow of gas across the seal to reduce the pressure difference thereacross. The passage may also carry vapour which has issued from the fluid surface. The passages can be arranged so as to only allow a bleed flow in one direction across the flange.

The invention will now be described, by way of example and with reference to the accompanying drawings in which.

Figure 1:
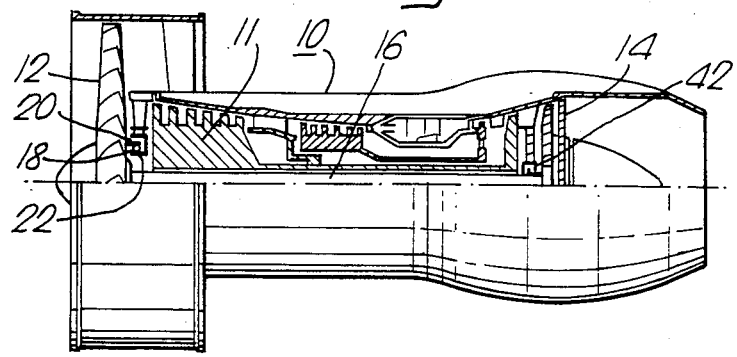
FIG. 1 is a diagrammatic view of a gas turbine engine incorporating two embodiments of the invention.

In FIG. 1 a gas turbine engine 10 has a compressor fan 12 driven by a low pressure turbine 14 via a shaft 16. The fan 12 is supported via a bearing 18 located between a fan stub shaft 20 and a fixed inner sleeve 22.

Figure 2:
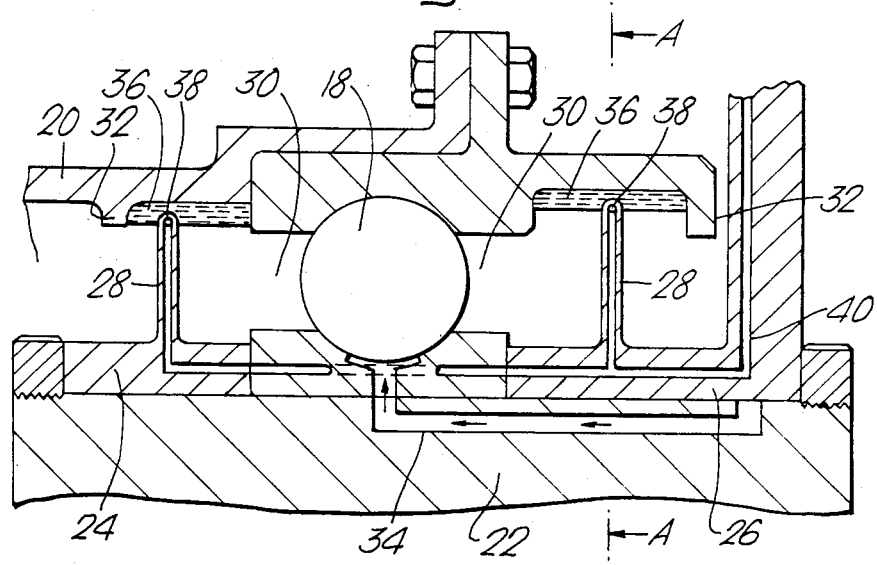
FIG. 2 is an enlarged, cross-sectional part view of the first embodiment of the invention of FIG. 1.

Referring to FIG. 2, the outer race of the bearing 18 is rotatable with the fan stub shaft 20. The fixed sleeve 22 carries two further sleeves 24 and 26 both of which include a radially outward directed circumferentially extending flange 28 which define a bearing chamber 30 therebetween.

Two radially inwardly directed circumferentially extending lips 32 are provided, one on the shaft 20 and one on the outer race of the bearing 18.

In operation of the gas turbine engine 10, lubricating oil is pumped to the bearing 18 through an oilway 34. After the oil has passed through the bearing 18 it is centrifuged radially outwards and forms annuli 36. Each flange 28 is proportioned such that, in operation, the periphery thereof is immersed in its respective annulus of oil thereby defining gas or vapour seals each side of the bearing 18.

A plurality of orifices 38 are provided on the periphery of each flange 28. The orifices 38 face in a direction opposite to that of the rotation of the oil. The outer diameter of the bearing chamber 30 and the speed of rotation of the fan stub shaft 20 are made sufficient to provide enough oil pressure for the oil to be able to return to an engine oil tank via conduit 40. The size of the orifices 38 is made sufficient to ensure there is always enough oil in the annuli to effect the seals. Furthermore, the orifices 38 are large enough to prevent a build up of oil and a situation where oil can spill over the lips 32. Preferably the bearing chamber 30 is pressurised with air from the low pressure compressor 11 and vented to the engine gearbox or oil tank to prevent the build up oil vapour within the chamber 30.

Figure 3:
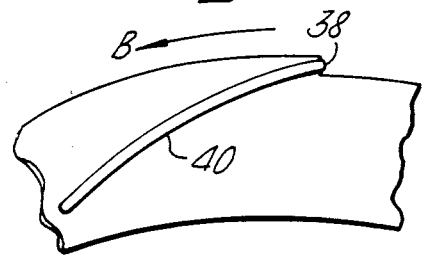
FIG. 3 is a view on the line AA of FIG. 2.

Referring now to FIG. 3, the conduit 40 downstream of each orifice 38 is arranged on a path which only gradually diverges from the periphery of the flanges 28. This is to minimise entry losses in the conduit 40. The arrow B shows the direction of rotation of the oil.

Figure 4:
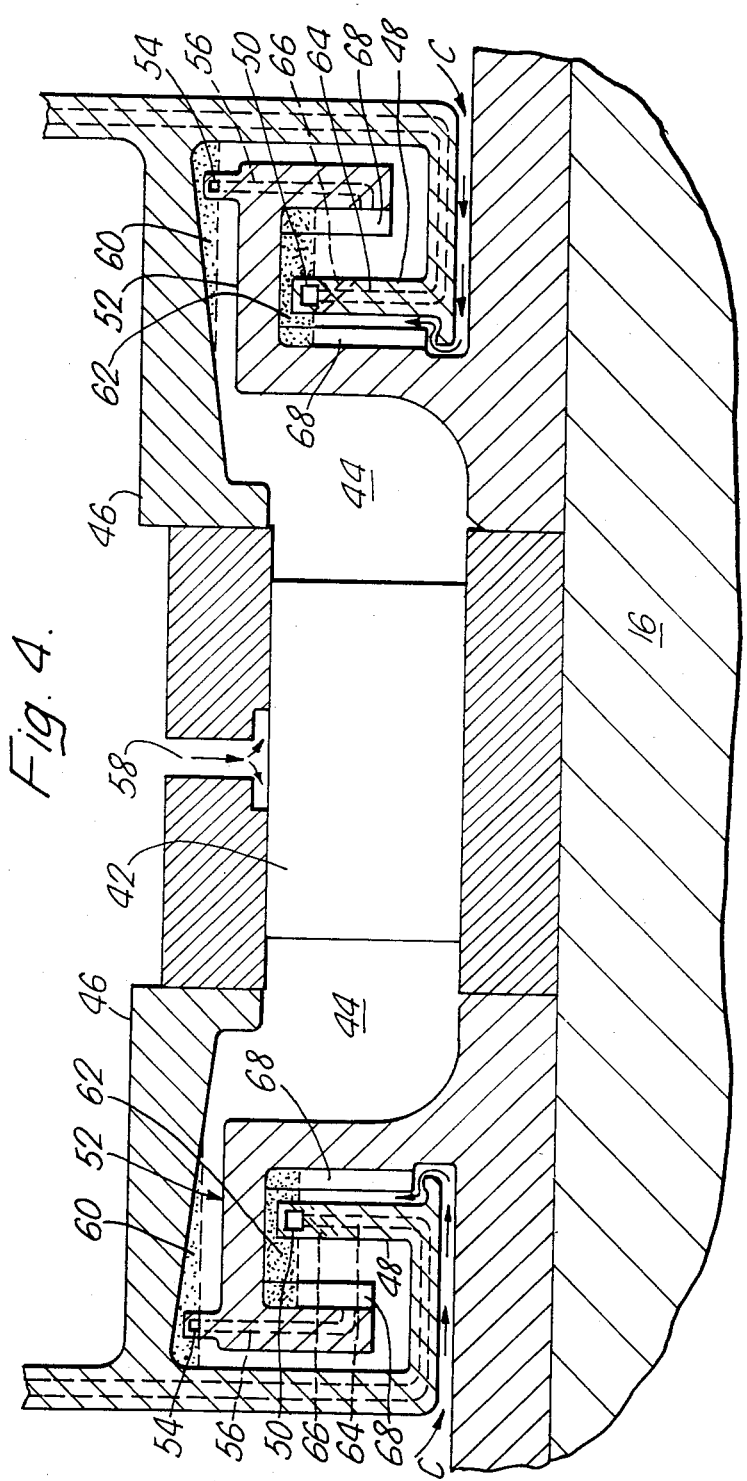
FIG. 4 is an enlarged cross-sectional part view of the second embodiment of the invention of FIG. 1.

FIG. 4 depicts a second embodiment of the invention in which the drive shaft 16 is supported via a bearing 42. A bearing chamber 44 is defined within two static housings 46 either side of the bearing 42. Each housing 46 includes a radially outward directed circumferentially extending flange 48 each having a plurality of orifices 50 arranged on the periphery thereof. Two rotatable housings 52 are provided within the bearing chamber 42. Each rotatable housing 52 has further orifices 54 which communicate via conduit 56 with the interior of the said housing.

In operation of the engine 10, oil is pumped to the bearing 42 via an oilway 58. After passing through the bearing 42 the oil is centrifuged towards the space between the static and rotatable housings 46 and 52 to form annuli 60. Oil is scooped into the conduit 56 via the orifices 54 and discharged into the rotatable housing 52. The oil is then centrifuged radially outward to form second annuli 62. The periphery of each flange 48 is arranged to protrude into its respective annuli 62 to define hydraulic gas seals. In this embodiment the orifices 50 are not completely submerged in the oil so that oil vapour and air rotating with the oil is forced into the orifice 50 together with neat oil. The dimensions of the flanges 48 and the rotational speed of the housing 52 ensure there is sufficient energy for oil to be returned to an oil tank via conduit 64. The size of the orifices 50 ensure there is always enough oil in the annuli 62 to maintain the gas seal.

Air from the engine low pressure compressor 11 acts on the hydraulic seals in the direction of arrow C. A plurality of passages 66 are provided in each flange 48 to allow compressor air to bleed into the bearing chamber 44. The passages 66 serve to nearly equalise the pressures acting on each side of the seals. The passages 66 are so arranged so that when the engine 10 is suddenly deaccelerated (causing the pressure inside the bearing chamber 44 to be transiently greater than the pressure acting in the direction of Arrow C) they are blocked by oil being forced radially inward, on the side of the flanges 48 in contact with the compressor air pressure, by the higher pressure air in the chamber 44. The air and oil vapour in the chamber 44 is forced into the orifices 50 and returned to the oil tank, via the conduit 64, where the oil may be separated out. When the air pressure in the bearing chamber 44 drops sufficiently the oil level across the flanges 48 will return to the steady state condition (where the oil level across the flanges 48 is nearly level). The passages 66 will reopen this resuming the air flow into the chamber 44.

There is provided a plurality of vanes 68 which exert a driving force on the oil. The vanes also help reduce the time taken to form the annuli 62 on the engine start up.

I claim:

1. A hydraulic gas seal comprising a rotatable sump chamber into which liquid is discharged and centrifuged radially outward to form an annulus of liquid, a fixed structure arranged concentrically within the sump chamber provided with a circumferentially extending radially outwardly directed flange which, in use, contacts the annulus of liquid and effects a weir and thus forms a gas seal between the two sides of the flange, and at least one conduit, incorporated in the fixed structure, for removal of liquid from the chamber, said conduit terminating in an orifice which, in use, at least partially is submerged in the annulus of liquid, and said orifice being arranged to utilise the ram effect of the rotating liquid to force liquid through it and away from the sump via the conduit.

2. A seal as claimed in claim 1 wherein the orifice is positioned so that, in use, it is completely submerged in the annulus of liquid.

3. A seal as claimed in claim 1 wherein the orifice is positioned so that, in use, it is partially submerged in the annulus of liquid, and the orifice also removes gas adjacent to and rotating with the surface of the liquid annulus from the sump via the conduit.

4. A seal as claimed in claim 1 wherein the orifice is provided on a ridge in the periphery of the flange and faces substantially in a direction opposite to that of the rotation of the liquid.

5. A seal as claimed in claim 1 wherein the rotatable sump chamber is provided with vanes for applying a driving force to the liquid.

6. A seal as claimed in claim 1 wherein the conduit is incorporated in the flange.

7. A seal as claimed in claim 1 wherein at least one passage is provided in the flange which, in use, allows a gas flow from a first side to a second side of the flange, said passage or passages are positioned and arranged such that if the pressure on the second side exceeds that on the first side, thereby forcing the liquid annulus radially inward on the first side, the passage becomes blocked with the displaced liquid which prevents flow through the passage from the second side to the first side.

* * * * *